(12) United States Patent
Fujisawa (10) Patent No.: US 7,697,442 B2
(45) Date of Patent: Apr. 13, 2010

(54) OUTPUT APPARATUS CONFIGURED TO OUTPUT DATA FOR PRINTING, PROCESSING APPARATUS CONFIGURED TO PROCESS PRINTING DATA, AND METHOD

(75) Inventor: Kunimasa Fujisawa, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 310 days.

(21) Appl. No.: 11/781,056

(22) Filed: Jul. 20, 2007

(65) Prior Publication Data

US 2008/0024825 A1  Jan. 31, 2008

(30) Foreign Application Priority Data

Jul. 28, 2006  (JP) ............................. 2006-206601

(51) Int. Cl.
*H04L 12/26* (2006.01)
(52) U.S. Cl. ..................... 370/241; 358/1.15; 358/1.18; 709/203
(58) Field of Classification Search ................. 358/1.05, 358/1.15; 370/241; 709/203
See application file for complete search history.

(56) References Cited

U.S. PATENT DOCUMENTS 6,144,990 A * 11/2000 Brandt et al. ................ 709/203
2005/0024677 A1 * 2/2005 Miura et al. ................ 358/1.15

FOREIGN PATENT DOCUMENTS

JP      5-108636 A    4/1993
JP      5-150920 A    6/1993

* cited by examiner

*Primary Examiner*—Albert T Chou
(74) *Attorney, Agent, or Firm*—Canon U.S.A., Inc. I.P. Division (57) ABSTRACT

An output apparatus is configured to output data for printing. The output apparatus acquires data based on identification information for identifying data to be acquired and merges the acquired data with each of a plurality of templates corresponding to the identification information. The output apparatus outputs the data merged with each of the plurality of templates according to a print setting for each template.

12 Claims, 10 Drawing Sheets

```
<dataGet>
  <server>
    database.hogehoge.com        ] 208
  </server>
  <query>
    address="Tokyo"              ] 209
  </query>
  <data>
    <dataList name="dataList">
      <item>name</item>
      <item>tel</item>           ] 210
      <item>address</item>
    </dataList>
  <data>
</dataGet>
```

```
<table>               211
<for listNmae="dataList"/>         218
  <tr>                212
    <td>
      <data name="dataList.name"/>      219
    </td>             213
    <td>
      <data name="dataList.tel"/>       220
    </td>             214
    <td>
      <data name="dataList.address"/>   221
    </td>
  </tr>               215
</for>                222
</table>              216
```

```
<dataGet>
  <server>
    database.hogehoge.com
  </server>                                    — 600
  <query>
    address="Tokyo"
  </query>                                     — 601
  <data>
    <item>CurrentDate</item>                   — 602
    <item>myCompanyName</item>                 — 603
    <dataList name="dataList">
      <item>name</item>
      <item>address</item>                     — 604
    </dataList>
    <dataList name="dataList2">
      <item>company</item>
      <item>address</item>                     — 605
      <item>presidentName</item>
    </dataList>
  <data>
</dataGet>
```
200a

FIG. 6B

```
<data name="CurrentDate"/>                     — 606
<table>
<for listNmae="dataList"/>                     — 607
  <tr>
    <td>
      <data name="dataList.name"/>             — 608
    </td>
    <td>
      <data name="dataList.address"/>          — 609
    </td>
  </tr>
</for>                                         — 610
</table>
```
202a

FIG. 6C

```
<data name="CurrentDate"/>        ] 611
<table>
<for listNmae="dataList2"/>       ] 612
  <tr>
    <td>
      <data name="dataList2.company"/>  ] 613
    </td>
    <td>
      <data name="dataList2.address"/>  ] 614
    </td>
  </tr>
</for>                            ] 615
</table>
```
203

FIG. 6D

```
<table>
<for listNmae="dataList2"/>       ] 616
  <tr>
    <td>
      <data name="dataList2.company"/>  ] 617
    </td>
    <td>
      <data name="dataList2.presidentName"/>  ] 618
    </td>
  </tr>
</for>                            ] 619
<data name="myCompanyName"/>      ] 620
</table>
```
204

FIG. 7

OUTPUT APPARATUS CONFIGURED TO OUTPUT DATA FOR PRINTING, PROCESSING APPARATUS CONFIGURED TO PROCESS PRINTING DATA, AND METHOD

BACKGROUND OF THE INVENTION

1. Field of the Invention

The present invention relates to an output apparatus configured to output data for printing, a processing apparatus configured to process printing data, and a method therefor.

2. Description of the Related Art

There is known a method for superimposing data on a form having a ruled line at the time of printing to print the resulting superimposed data. Further, Japanese Patent Application Laid-Open No. 05-150920 discusses a method in which a format of a form and data are merged on a computer to generate form printing data and the generated form print data is printed, instead of superimposing data on a form having a ruled line at the time of printing.

In the above-described methods, data is superimposed on a form format, or data and a form format are mutually merged. Meanwhile, Japanese Patent Application Laid-Open NO. 05-108636 discusses a method for automatically acquiring data to be merged with a form in order to automatically create a repetitive document. In the method discussed in Japanese Patent Application Laid-Open No. 05-108636, a pointer indicating information describing a method for acquiring data is embedded in a form format. Furthermore, the data is acquired according to the method for acquiring data indicated by the pointer and the acquired data is merged with the form format.

Further, in a conventional method, a form template is divided for each print setting to be applied to separately and individually print the divided form templates, so as to allow a user to handle the printed form templates as one form for user convenience. However, even if data which is common among the divided form templates is acquired and merged, the form templates are printed as different forms. Accordingly, in this case, it is necessary to acquire data for each individual form template.

Accordingly, if a database has been changed during generation of an individual form, a user may output an individual form as one integrated form. In this case, values included in the data may differ among the forms when the same values should be included in the data.

SUMMARY OF THE INVENTION

The present invention is directed to an output apparatus configured to change a print setting for each template and a method therefor.

According to an aspect of the present invention, an output apparatus configured to output data for printing includes: an acquisition unit configured to acquire data based on identification information for identifying data to be acquired; a merging unit configured to merge the acquired data with each of a plurality of templates corresponding to the identification information; and an output unit configured to output the data merged with each of the plurality of templates according to a print setting for each of the plurality of templates.

According to another aspect of the present invention, a processing apparatus configured to process printing data includes: an acquisition unit configured to acquire data; an allocation unit configured to allocate the acquired data to each of a plurality of templates, with data to be used in common with the plurality of templates being allocated to each of the plurality of templates; and a processing unit configured to process the data allocated to each of the plurality of templates based on each template and a print setting for each template.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

First Exemplary Embodiment

Figure 1:
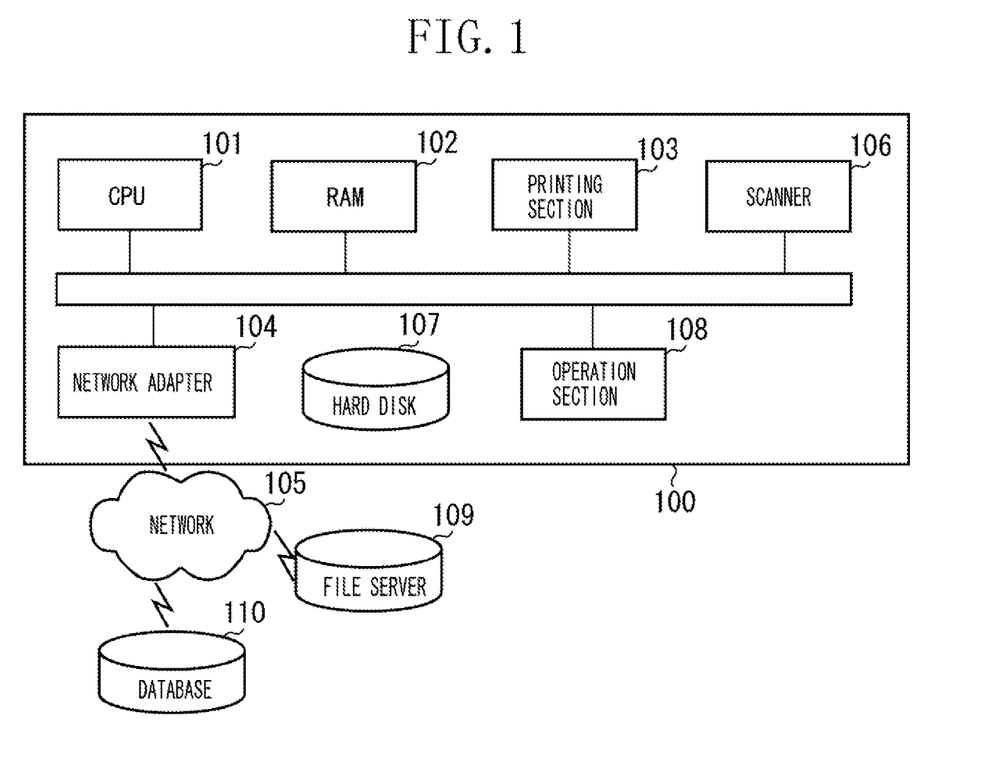
FIG. 1 is a block diagram illustrating an exemplary configuration of a copying machine according to a first exemplary embodiment of the present invention.

FIG. 1 is a block diagram illustrating an exemplary configuration of a copying machine according to a first exemplary embodiment of the present invention. Here, the exemplary embodiment of the present invention is not limited to a copying machine. For example, the present invention can be applied to an integrated device having a printing function, such as a printer, a handy terminal apparatus, and a digital camera.

In FIG. 1, a central processing unit (CPU) 101 controls a copying machine 100. A random access memory (RAM) 102 temporarily stores a program supplied from an external device, data acquired from a database 110, intermediate data generated during execution of a program, and generated form data. A hard disk 107 is fixedly installed on the copying machine 100. The hard disk 107 stores a program for controlling the copying machine 100, a program for generating a form, generated form data, and a form template set (described later below). The CPU 101 executes a program for generating a form stored on the hard disk 107 to perform processing illustrated in a flow chart to be described later.

A printing section 103 executes printing. An operation section 108 enables a user to operate the copying machine 100. The operation section 108 is configured by a button and a display having a touch panel. A network adaptor 104 acquires data from the database 110 via a network 105 according to a program. Furthermore, the network adaptor 104 stores generated form data in a file server 109 via the network 105. A scanner 106 allows a user to capture image data of a document. In the present exemplary embodiment, the database 110 is stored on a hard disk of another apparatus (e.g., a database server) that is in communication with the copying machine 100 via the network 105.

Figure 2A:
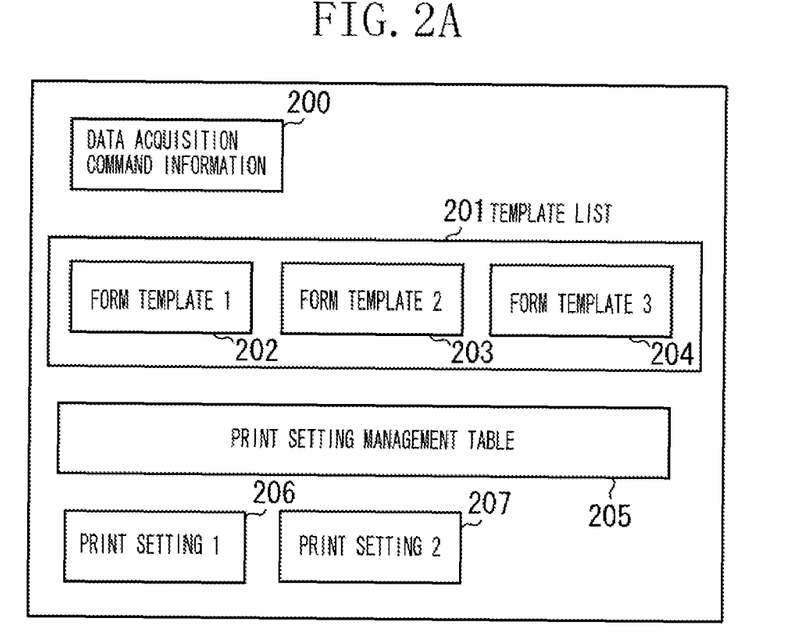
FIG. 2A is a diagram illustrating an exemplary form template set according to the first exemplary embodiment of the present invention.

FIG. 2A is a diagram illustrating an example of a form template set according to the present exemplary embodiment. The form template set includes data acquisition command information 200, a template list 201 including a plurality of form templates (a "form template 1" 202, a "form template 2" 203, and a "form template 3" 204), and a print setting management table 205. Further, the form template set includes a plurality of print settings 206 and 207 as form output setting information. In the template list 201, the form template 1 202, the form template 2 203, and the form template 3 204 are stored in order of processing templates.

Figure 2B:
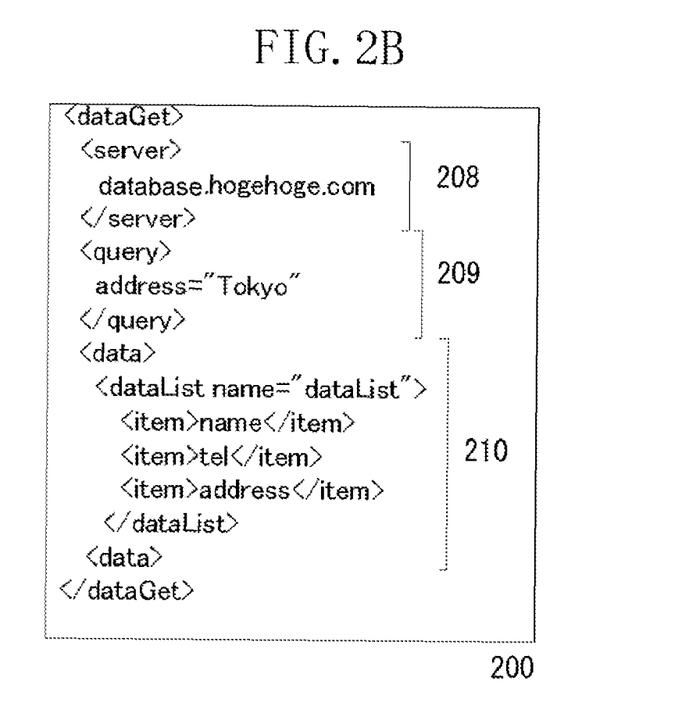
FIG. 2B is a diagram illustrating an example of data acquisition command information according to the first exemplary embodiment of the present invention.
Figure 2C:
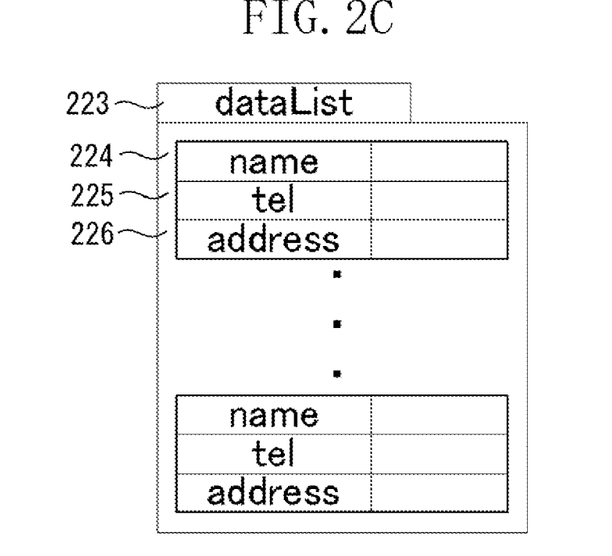
FIG. 2C is a diagram illustrating an example of a list of data according to the first exemplary embodiment of the present invention.

FIG. 2B is a diagram illustrating an example of the data acquisition command information 200 according to the present exemplary embodiment. FIG. 2C is a diagram illustrating an example of a list of data according to the present exemplary embodiment.

The data acquisition command information 200 includes, for example, a database server (database 110) name 208, a search condition (query) 209, and a description 210. The search condition 209 is a condition for acquiring data from the database 110. The description 210 indicates information about a structure of the acquired data. An example in FIG. 2B illustrates a case of searching for a record having an address field "Tokyo" from a database server whose uniform resource locator (URL) is "database.hogehoge.com". Furthermore, the example in FIG. 2B illustrates a case of acquiring a list of data 223 (FIG. 2C), which is configured by a record having a name field 224, a "tel" field 225, and an address field 226 and whose name is "dataList".

Figure 2D:
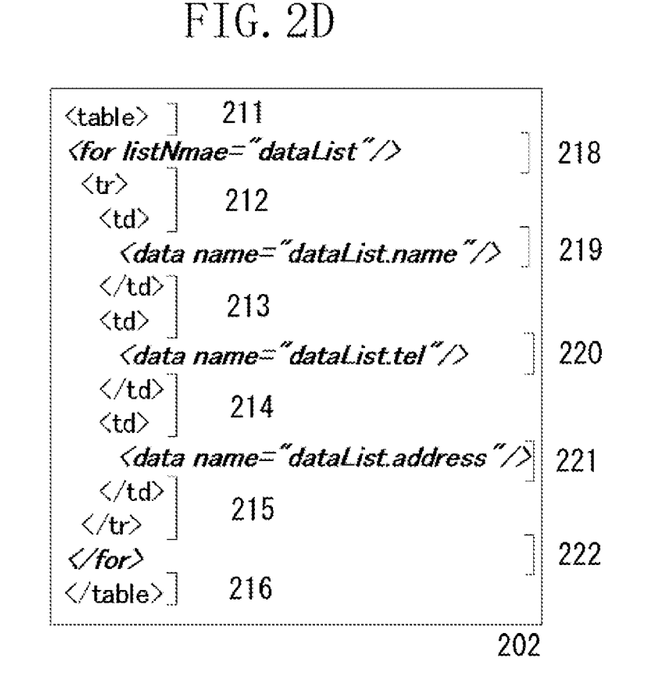
FIG. 2D is a diagram illustrating an example of a form template according to the first exemplary embodiment of the present invention.

FIG. 2D is a diagram illustrating an example of the form template 1 202 according to the present exemplary embodiment. The form template 1 202 includes form format information 211 through 216 and merge information 218 through 222 respectively describing information about how to merge the acquired data.

Each of the merge information 218 through 222 indicates a command for extracting data included in the list of data "dataList" piece by piece, extracting each of a "name" element, a "tel" element, and an "address" element of the extracted data, and merging the extracted data and elements with a template.

Figure 2E:
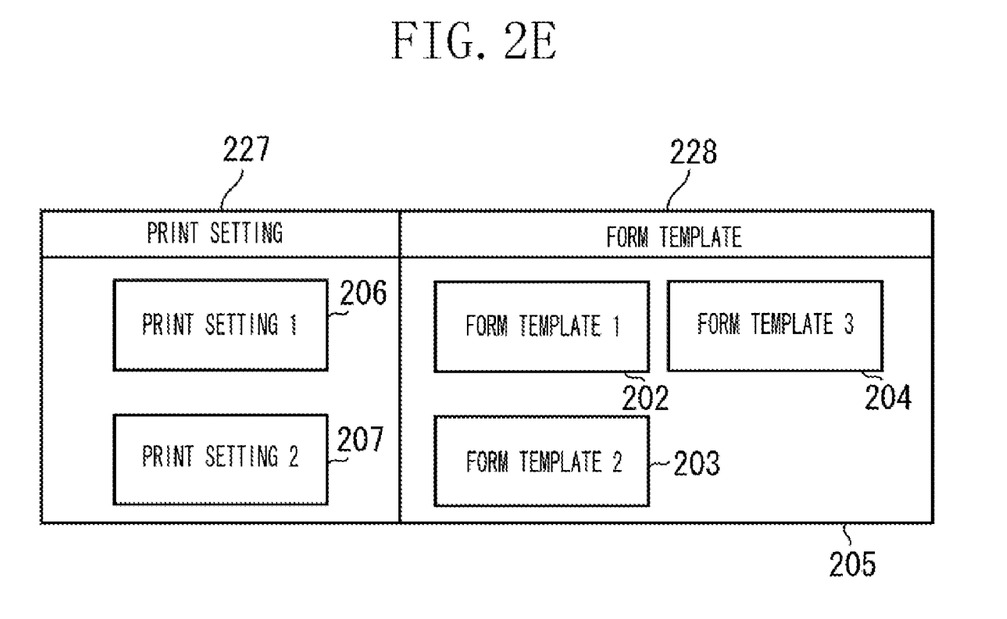
FIG. 2E is a diagram illustrating an example of a print setting management table according to the first exemplary embodiment of the present invention.

FIG. 2E is a diagram illustrating an example of the print setting management table 205 according to the present exemplary embodiment. The print setting management table 205 includes a print setting column 227 and a form template column 228. The print setting management table 205 stores information about correspondence between a print setting and a form template. For example, an example in FIG. 2E indicates that the print setting 1 206 corresponds to the form template 1 202 and the form template 3 204. That is, the example in FIG. 2E indicates that the print setting 1 206 is used for printing the form template 1 202 and the form template 3 204.

Further, the example in FIG. 2E indicates that the print setting 2 207 corresponds to the form template 2 203 and the print setting 2 207 is used for printing the form template 2 203.

Figure 3:
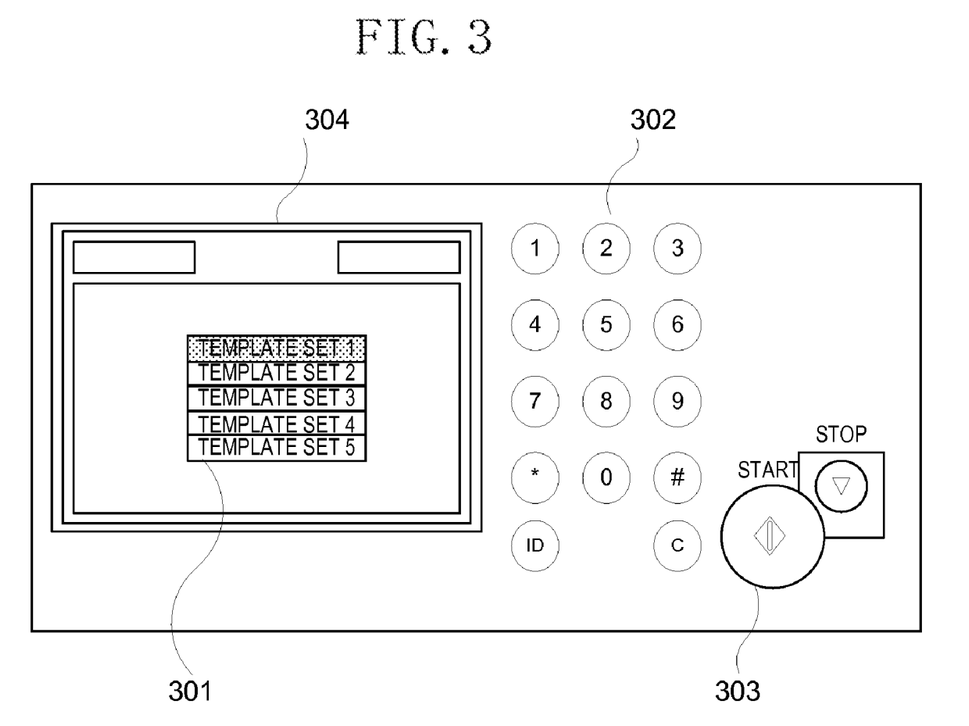
FIG. 3 is a diagram illustrating an example of an operation section according to the first exemplary embodiment of the present invention.

FIG. 3 is a diagram illustrating an example of the operation section 108 according to the present exemplary embodiment. The operation section 108 includes a display 304 having a touch panel, a start button 303 that allows a user to generate an instruction for starting output processing, and various buttons 302 that allow a user to perform various operations.

On the touch panel-equipped display 304, a selection list 301 that allows a user to select a form template set is displayed.

Figure 4:
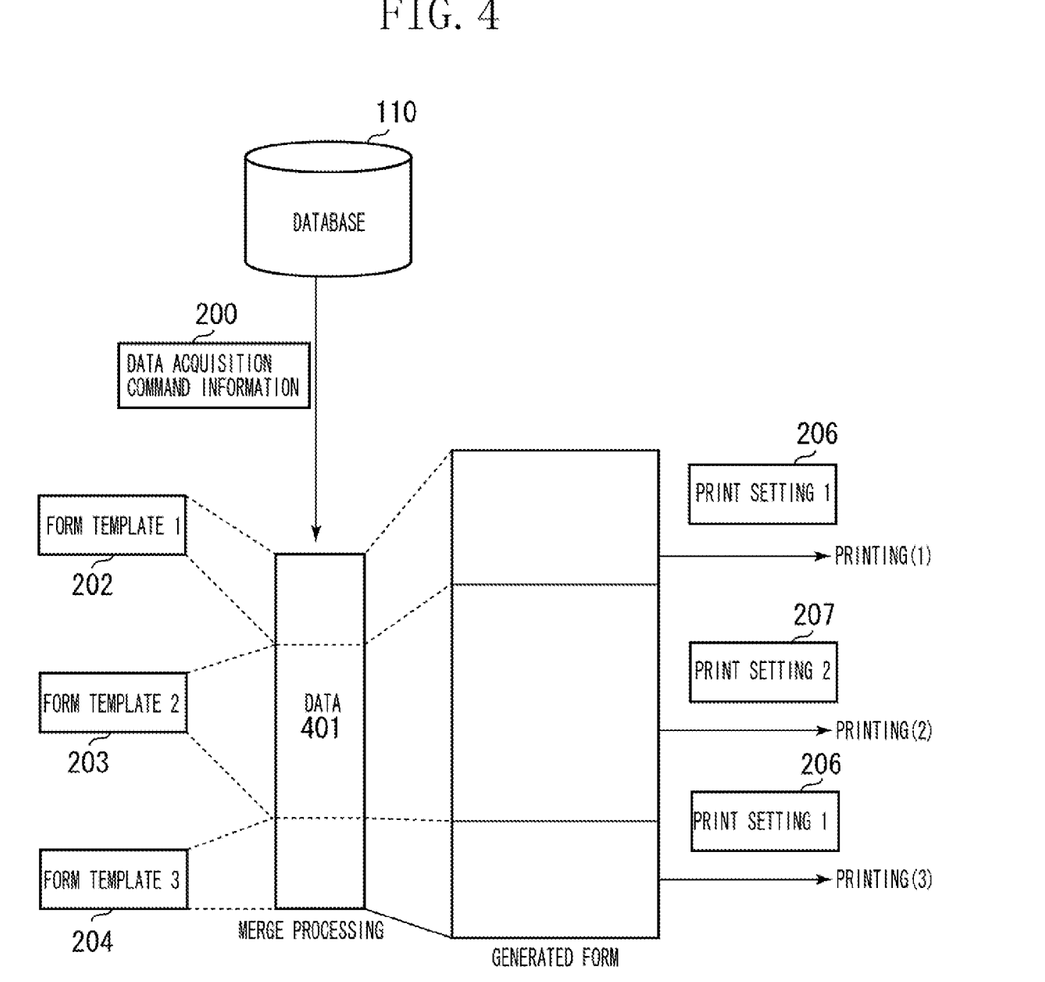
FIG. 4 is a diagram illustrating processing for merging data acquired from a database with a form template to execute printing according to a print setting, according to the first exemplary embodiment of the present invention.

FIG. 4 is a diagram illustrating processing for merging data acquired from the database 110 with a form template using the form template set illustrated in FIG. 2A to execute printing according to a print setting.

Data 401 is acquired from the database 110 according to the data acquisition command information 200.

The form template 1 202 is merged with the data 401 to generate form data. The generated form data is printed (printing (1) in FIG. 4) according to the print setting 1 206, which is a print setting corresponding to the form template 1 202.

Then, the form template 2 203 is merged with the data 401 to generate form data. The generated form data is printed (printing (2) in FIG. 4) according to the print setting 2 207, which is a print setting corresponding to the form template 2 203.

Then, the form template 3 204 is merged with the data 401 to generate form data. The generated form data is printed (printing (3) in FIG. 4) according to the print setting 1 206, which is a print setting corresponding to the form template 3 204.

Figure 5:
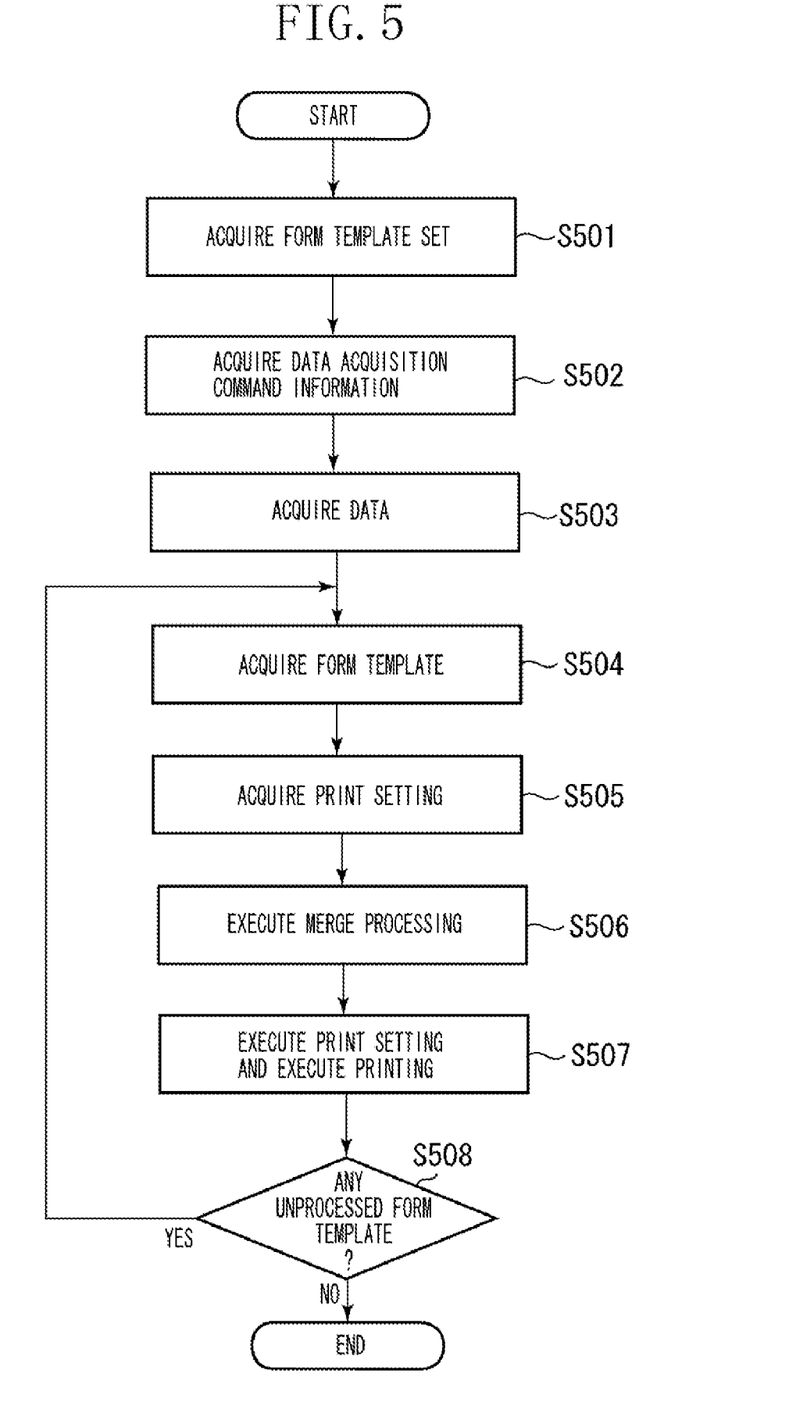
FIG. 5 is a flow chart illustrating an example of form generation processing according to the first exemplary embodiment of the present invention.

FIG. 5 is a flow chart illustrating an example of form generation processing according to the present exemplary embodiment. First, a user selects a form template set, such as the one illustrated in FIG. 2A, from the selection list 301 (FIG. 3). When the start button 303 is pressed by the user, the copying machine 100 starts processing illustrated in FIG. 5.

Referring to FIG. 5, in step S501, the copying machine 100 acquires the form template set, which is selected from the selection list 301, from the hard disk 107. In step S502, the copying machine 100 acquires the data acquisition command information 200 from the acquired form template set.

Then, in step S503, the copying machine 100 acquires data from the database 110 according to the data acquisition command information 200 acquired in step S502.

In step S504, the copying machine 100 acquires one form template from the template list 201. In the example illustrated in FIG. 2A, the copying machine 100 first acquires the form template 1 202. In step S505, the copying machine 100 acquires a print setting corresponding to the form template acquired in step S504 from the print setting management table 205.

Then, in step S506, the copying machine 100 merges the data acquired in step S503 with the form template acquired in step S504. Thus, the copying machine 100 performs data generation processing. In the present exemplary embodiment, the "merging" refers to arranging data on a form template according to the format of the form template.

In step S507, the copying machine 100 prints the form data generated in step S506 according to the print setting acquired in step S505.

Subsequently, in step S508, the copying machine 100 determines whether a form template yet to be subjected to data generation processing (or printing processing) exists in the form template set acquired in step S501. If it is determined in step S508 that a form template yet to be subjected to data generation processing (or printing processing) exists in the form template set acquired in step S501 (YES in step S508), the copying machine 100 returns to step S504. On the other hand, if it is determined in step S508 that no form template yet to be subjected to data generation processing (or printing processing) exists in the form template set acquired in step S501 (NO in step S508), the copying machine 100 ends the processing illustrated in FIG. 5.

Second Exemplary Embodiment

Now, a second exemplary embodiment of the present invention will be described below. In the present exemplary embodiment, a case will be described in which data acquired from the database 110 is repeatedly used in different form templates.

The configuration of the copying machine 100, a user interface, and a flow chart in the present exemplary embodiment are similar to those in the first exemplary embodiment.

Figure 6A:
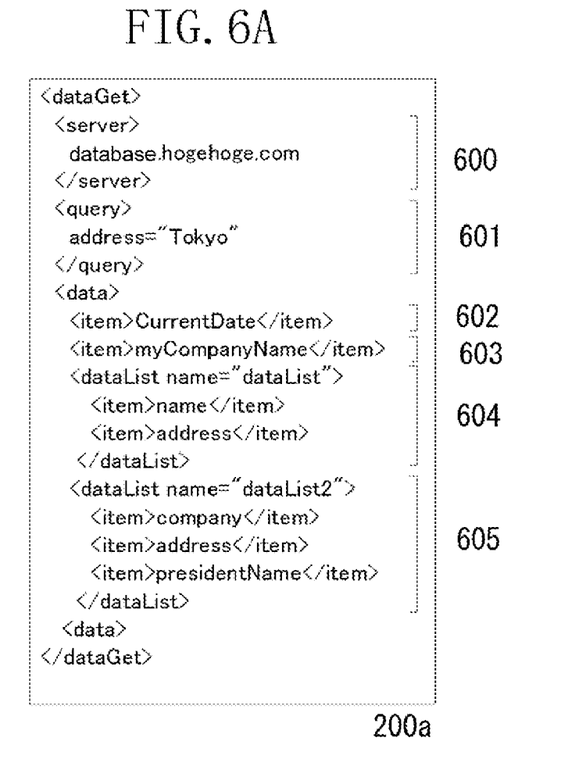
FIG. 6A is a diagram illustrating an example of data acquisition command information according to a second exemplary embodiment of the present invention.

FIG. 6A is a diagram illustrating an example of data acquisition command information 200a according to the present exemplary embodiment. A description 600 indicates a command for acquiring data from the database server "database.hogehoge.com". A description 601 indicates a search condition (query) used in acquiring data. In the example illustrated in FIG. 6A, the description 601 indicates a search condition for searching for a record whose address field is "Tokyo". A description 602 indicates a command for acquiring data "CurrentDate".

A description 603 indicates a command for acquiring data "myCompanyName". A description 604 indicates a command for acquiring a list of data whose data list name is "dataList" including a record having a name field and an address field. A description 605 indicates a command for acquiring a list of data whose data list name is "dataList2" including a record having a company field, a "presidentName" field, and an address field.

Figure 6B:
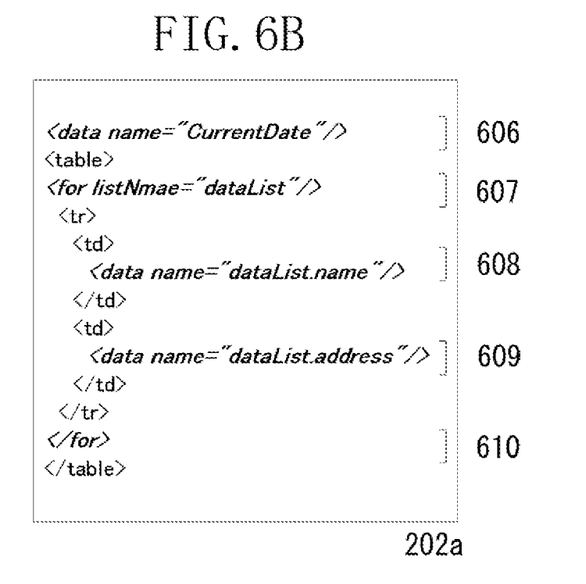
FIG. 6B is a diagram illustrating details of a form template according to the second exemplary embodiment of the present invention.

FIG. 6B is a diagram illustrating details of a form template 1 202a according to the present exemplary embodiment. A description 606 indicates a command for merging a value for "CurrentDate". Each of merge information 607 through 610 indicates a command for extracting data included in the list of data "dataList" piece by piece, extracting values for the name field and the address field of the extracted data, and merging the extracted data and values with a form template.

Figure 6C:
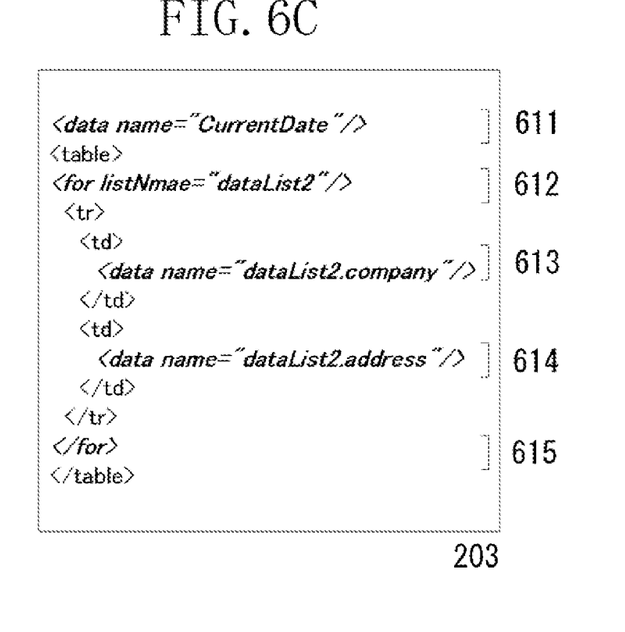
FIG. 6C is a diagram illustrating details of a form template according to the second exemplary embodiment of the present invention.

FIG. 6C is a diagram illustrating details of the form template 2 203 according to the present exemplary embodiment. A description 611 indicates a command for merging the value for the data "CurrentDate". Each of merge information 612 through 615 indicates a command for extracting data included in the list of data "dataList2" piece by piece, extracting values for the company field and the address field of the extracted data, and merging the extracted data and values with a form template.

Figure 6D:
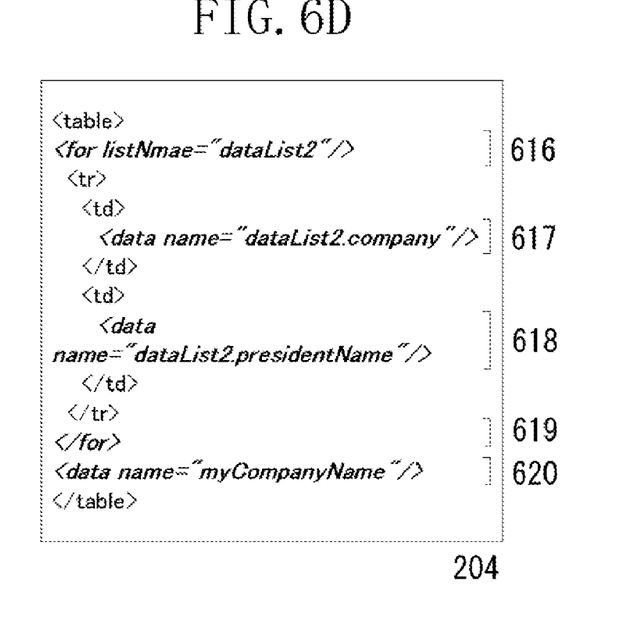
FIG. 6D is a diagram illustrating details of a form template according to the second exemplary embodiment of the present invention.

FIG. 6D is a diagram illustrating details of the form template 3 204 according to the present exemplary embodiment. Each of merge information 616 through 619 indicates a command for extracting data included in the list of data "dataList2" piece by piece, extracting values for the company field and the "presidentName" field of the extracted data, and merging the extracted data and values with a form template. A description 620 indicates a command for merging the value for the data "myCompanyName".

Figure 7:
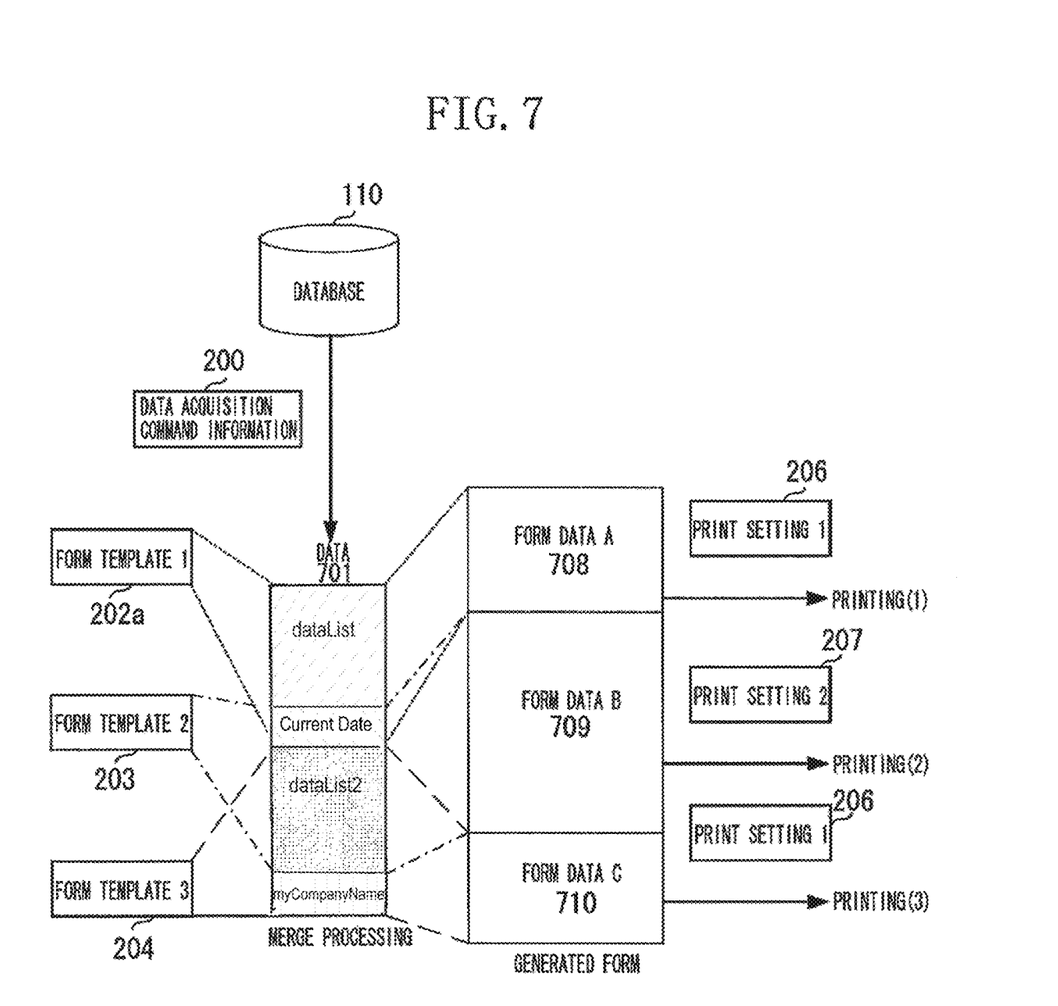
FIG. 7 is a view illustrating a case in which data is repeatedly used among form templates according to the second exemplary embodiment of the present invention.

FIG. 7 is a view illustrating a case in which data is repeatedly used among form templates according to the present exemplary embodiment. The form template 1 202a is merged with the list of data "dataList" (including a name field and an address field) and the data "CurrentDate", to generate form data A 708. Here, referring to the print setting management table 205 in FIG. 2E, a print setting corresponding to the form template 1 202a is the print setting 1 206. Accordingly, the form data A 708 is printed (printing (1) in FIG. 7) using the print setting 1 206.

The form template 2 203 is merged with the list of data "dataList2" (including a company field and an address field) and the data "CurrentDate", to generate form data B 709. Here, referring to the print setting management table 205 in FIG. 2E, a print setting corresponding to the form template 2 (203) is the print setting 2 207. Accordingly, the form data B 709 is printed (printing (2) in FIG. 7) using the print setting 2 207.

The form template 3 204 is merged with the list of data "dataList2" (including a company field and a "presidentName" field) and the data "myCompanyName", to generate form data C 710. Here, referring to the print setting management table 205 in FIG. 2E, a print setting corresponding to the form template 3 204 is the print setting 1 206. Accordingly, the form data C 710 is printed (printing (3) in FIG. 7) using the print setting 1 206.

At this time, the data "CurrentDate" included in the data 701 acquired from the database 110 is used in both the form template 1 202a and form template 2 203.

Similarly, the list of data "dataList2" (value for the company field) is used in both the form template 2 203 and form template 3 204.

Other Exemplary Embodiments

The present invention can also be achieved by providing a system or an apparatus with a storage medium storing program code (software) implementing the functions of the embodiments and by reading and executing the program code stored in the storage medium with a computer of the system or the apparatus (a CPU or a micro processing unit (MPU)). In this case, the program code itself, which is read from the storage medium, implements the functions of the embodiments described above.

In addition, the functions according to the embodiments described above can be implemented not only by executing the program code read by the computer, but also implemented by the processing in which an operating system (OS) or the like carries out a part of or the whole of the actual processing based on an instruction given by the program code.

Further, after the program code read from the storage medium is written in a memory provided in a function expansion board inserted in a computer or a function expansion unit connected to the computer, a CPU and the like provided in the function expansion board or the function expansion unit can carry out a part of or the whole of the processing to implement the functions of the embodiments described above.

In the case of applying the present invention to the above-described recording (storage) medium, the recording medium stores program code corresponding to the processing illustrated in the above-described flow chart.

According to each of the above-described exemplary embodiments, pages with different print settings, such as settings for a color page and a monochrome page, settings for an A4 size and an A3 size, and settings for a portrait printing and landscape printing, can mixedly exist in a form (form data) generated according to one form template set.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-206601 filed Jul. 28, 2006, which is hereby incorporated by reference herein in its entirety.

What is claimed is:

1. An output apparatus configured to output data for printing, the output apparatus comprising:
   a storage unit configured to store a plurality of templates and a plurality of print settings;
   an acquisition unit configured to acquire data based on identification information for identifying data to be acquired;
   a generating unit configured to generate a plurality of pages of image data by merging the acquired data with each of the plurality of templates corresponding to the identification information;
   a selecting unit configured to select a print setting corresponding to each of the plurality of templates; and
   an output unit configured to output each of the plurality of pages of image data according to the print setting corresponding to each of the plurality of templates.

2. The output apparatus according to claim 1, wherein each of the plurality of templates includes a format of a form and data merge information indicating into which portion of the form the acquired data is to be inserted.

3. A processing apparatus configured to process printing data, the processing apparatus comprising:
   a storage unit configured to store a plurality of templates and a plurality of print settings;
   an acquisition unit configured to acquire data;
   an allocation unit configured to allocate the acquired data to each of the plurality of templates, with data to be used in common with the plurality of templates being allocated to each of the plurality of templates;
   a generating unit configured to generate a plurality of pages of image data by merging the allocated data with each of the plurality of templates;
   a selecting unit configured to select a print setting corresponding to each of the plurality of templates; and
   a processing unit configured to process the data allocated to each of the plurality of templates based on each of the plurality of templates and on the print setting corresponding to each of the plurality of templates.

4. The processing apparatus according to claim 3, wherein the acquisition unit is configured to acquire data based on a data acquisition condition.

5. A method for an output apparatus including a storage unit to store a plurality of templates and a plurality of print settings, an acquisition unit, a generating unit, a selecting unit and an output unit to output data for printing, the method comprising:
   acquiring data, by the acquisition unit, based on identification information for identifying data to be acquired;
   generating, by the generating unit, a plurality of pages of image data by merging the acquired data with each of the plurality of templates corresponding to the identification information;
   selecting, by the selecting unit, a print setting corresponding to each of the plurality of templates; and
   outputting, by the outputting unit, each of the plurality of pages of image data according to the print setting corresponding to each of the plurality of templates.

6. The method according to claim 5, wherein each of the plurality of templates includes a format of a form and data merge information indicating into which portion of the form the acquired data is to be inserted.

7. A method for a processing apparatus including a storage unit to store a plurality of templates and a plurality of print settings, an acquisition unit, an allocation unit, a generation unit, a selecting unit and a processing unit to process printing data, the method comprising:
   acquiring data, by the acquisition unit;
   allocating, by the allocation unit, the acquired data to each of the plurality of templates with data to be used in common with the plurality of templates being allocated to each of the plurality of templates;
   generating, by the generating unit, a plurality of pages of image data by merging the allocated data with each of the plurality of templates;
   selecting, by the selecting unit, a print setting corresponding to each of the plurality of templates for outputting the plurality of pages of image data; and
   processing, by the processing unit, the data allocated to each of the plurality of templates based on each of the plurality of templates and on the print setting corresponding to each of the plurality of templates.

8. The method according to claim 7, wherein data is acquired based on a data acquisition condition.

9. A computer-readable storage medium storing instructions which, when executed by an apparatus including a storage unit to store a plurality of templates and a plurality of print settings, cause the apparatus to perform operations comprising:
   acquiring data based on identification information for identifying data to be acquired;
   generating a plurality of pages of image data by merging the acquired data with each of the plurality of templates corresponding to the identification information;
   selecting a print setting corresponding to each of the plurality of templates for outputting the plurality of pages of image data; and
   outputting each of the plurality of pages of image data according to the print setting corresponding to each of the plurality of templates.

10. The computer-readable storage medium according to claim 9, wherein each of the plurality of templates includes a format of a form and data merge information indicating into which portion of the form the acquired data is to be inserted.

11. A computer-readable storage medium storing instructions which, when executed by an apparatus including a storage unit to store a plurality of templates and a plurality of print settings, cause the apparatus to perform operations comprising:

acquiring data;

allocating the acquired data to each of a plurality of templates with data to be used in common with the plurality of templates being allocated to each of the plurality of templates;

generating a plurality of pages of image data by merging the allocated data with each of the plurality of templates;

selecting a print setting corresponding to each of the plurality of templates for outputting the plurality of pages of image data; and processing the data allocated to each of the plurality of templates and on the print setting corresponding to each of the plurality of templates.

12. The computer-readable storage medium according to claim 11, wherein data is acquired based on a data acquisition condition.

* * * * *